July 25, 1933.  S. H. H. PARSONS  1,919,741

LUBRICATED BEARING

Original Filed July 27, 1929

INVENTOR
Sylvanus H. H. Parsons

BY John J. Thompson
ATTORNEY

Patented July 25, 1933

1,919,741

UNITED STATES PATENT OFFICE

SYLVANUS H. H. PARSONS, OF COSCOB, CONNECTICUT

LUBRICATED BEARING

Original application filed July 27, 1929, Serial No. 381,543. Divided and this application filed October 21, 1930. Serial No. 490,159.

This invention relates to an improved method and construction of supplying lubricant to stuffing boxes or bearings of that class which are packed with flax or other suitable material, and the present application has been divided from my application for a patent on a lubricated stuffing box, which was filed on July 27, 1929 under Serial No. 381,543 and in which I illustrate a form of circular combined lubricant container and distributor, while in the present invention I illustrate, describe and claim a combined lubricant container and distributor in the form of a member mounted in parallel relation to the shaft between the abutting ends of the packing strips.

In the usual bearing which is packed with rings of flax or other suitable material between the inner walls of the bearing and the shaft and which are retained in place by a packing gland or flanged collar, sufficient lubricant does not get to the shaft from the usual form of grease cup.

An object of the invention is to provide means whereby a proper lubricant such as oil may be applied to the shaft within the bearing and through or between the rings of packing.

Another object of the invention is to provide an oil chamber adapted to be mounted adjacent to the shaft and within the bearing, both to receive and hold a supply of lubricant and to distribute and feed the same to the shaft.

With these and other objects in view, my invention consists in certain construction and combination of parts as will hereinafter be fully described and claimed and illustrated in the accompanying drawing in which like figures of reference refer to corresponding parts in all of the views, but it is understood that slight changes may be made without departing from the spirit of the invention.

In the drawing:—

Referring to the drawing:—

Figures 1, 2, 3:
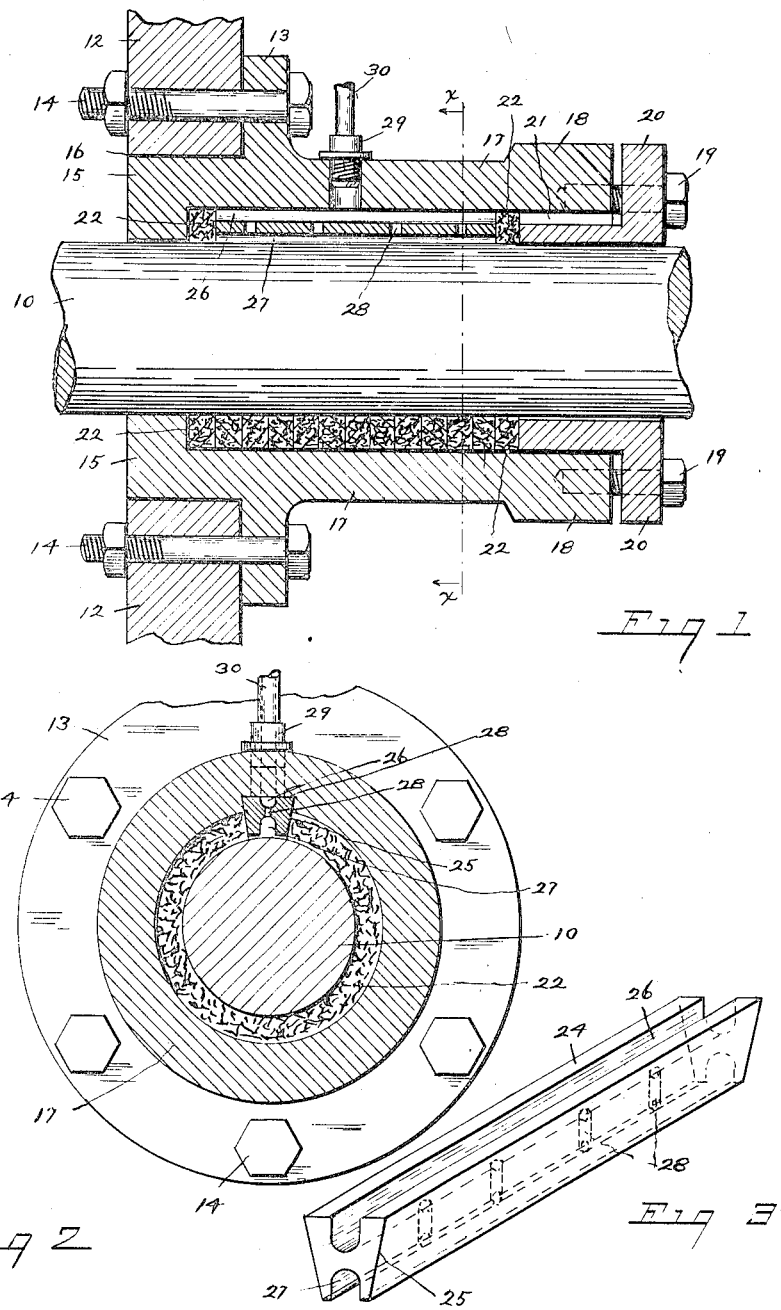
Figure 1 shows a longitudinal sectional view of a bearing in which is embodied my invention.
Figure 2 is a cross sectional view of the same bearing, taken on the line X—X of Figure 1.
Figure 3 is an enlarged detail view of the oil or lubricant holder and distributor.

The shaft is indicated by the numeral 10, and the stern post or strut to which the bearing is attached by the numeral 12.

The bearing or stuffing box is of the usual type and comprises a tubular member formed with a flange 13 for attachment to the part of the boat or other article by the bolts 14; the member 15 being adapted to enter a hole or recess prepared for it in the part 12; and the outer tubular part 17 is enlarged as at 18 to receive the cap screws 19 with which the gland 20 is held in place.

Said bearing is provided with the usual counterbore 21, to hold the packing rings 22 which are compressed by the end of the gland 20 which enters said counterbore 21 and which is held by the studs or screws 19, thus providing a tight bearing to keep out water, oil, etc.

To apply lubricant in some suitable manner and of the form of oil, grease, etc., directly to the rotating shaft and without depending upon the oil seeping through the packing material or between the same, I have provided an oil or lubricant container 24 in the form of a key formed either with straight or tapered sides 25 and also formed with an upper oil groove 26 and a lower oil groove 27, connected together by a series of ducts 28.

This lubricant container 24 is mounted in a key-way which is formed in the upper side of the inner surface of the bearing, and the lower part of the container 24 projects downward to within almost a contact with the shaft 10, and the rings of packing material 22 have a small portion cut out and have their ends abutted against the sides of the container, thus not only preventing any rotation of the packing rings, but providing a free flow of lubricant to the shaft 10.

The upper groove 26 tending to distribute the lubricant the entire length of the container allowing the lower groove 27 to fill and apply the lubricant the entire length of the shaft within the bearing.

For feeding the lubricant to said container 24 there is provided a hole through the wall of the bearing at some suitable location, and this hole is threaded for a connection 29, which is connected by a feed pipe 30 to an oil or lubricant supply which may be located in some suitable place.

This style of oiler may be used in connection with thrust bearings or in any bearing in which packing is employed.

Having thus described my invention, what I claim as new and desire to secure by Letters Patent, is:—

1. A device for supplying lubricant to a packed bearing and securing the packing therein, comprising in combination with a bearing formed with a packing chamber having a keyway and packing contained in said chamber, of a combined lubricant container, key, and distributor adapted to be mounted in the keyway of the packing chamber and extending partly through said packing and adapted to feed the lubricant directly to the shaft.

2. A combined packing key and oiler for rotating shafts, comprising in combination with a bearing containing packing rings formed with a keyway, of a key member having tapered sides and formed with a groove in the top and bottom thereof connected by ducts, said key member mounted within said keyway and within said packing rings to prevent the rotation of said rings and lubricate the same.

SYLVANUS H. H. PARSONS.